Figure 1:
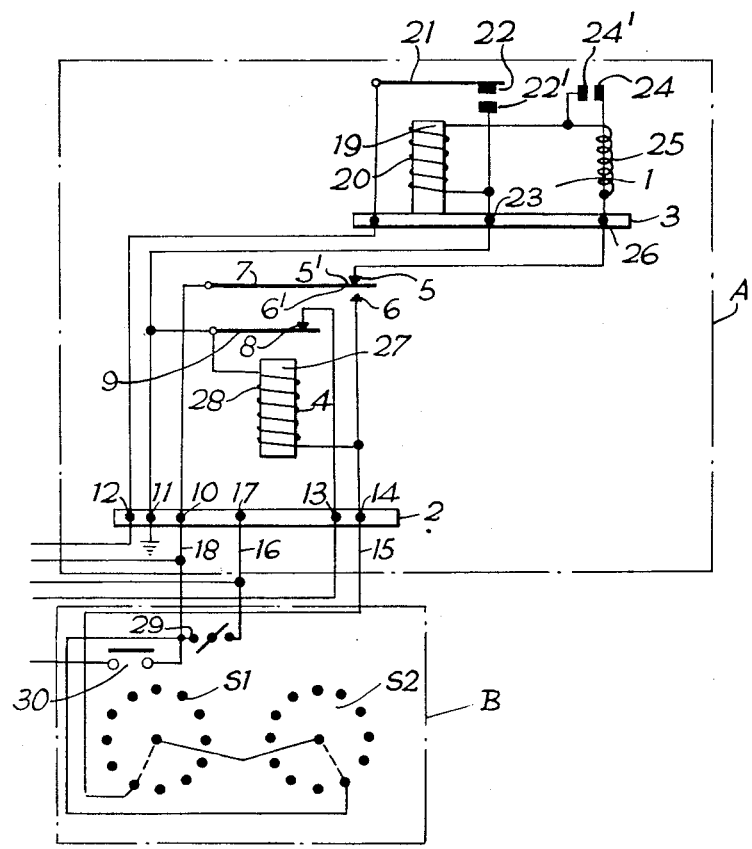

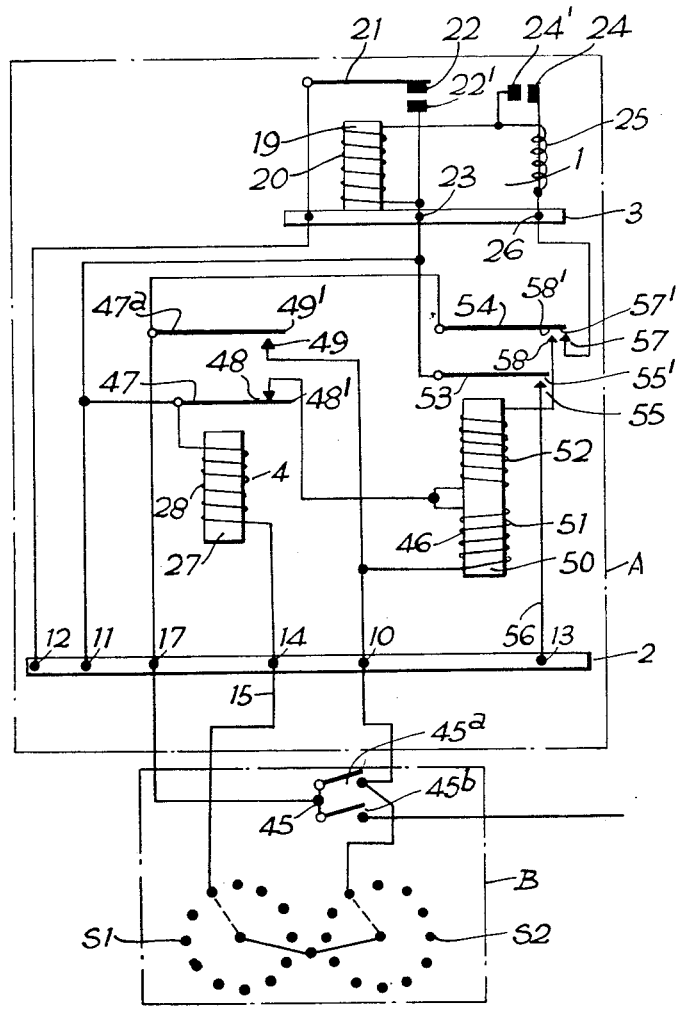

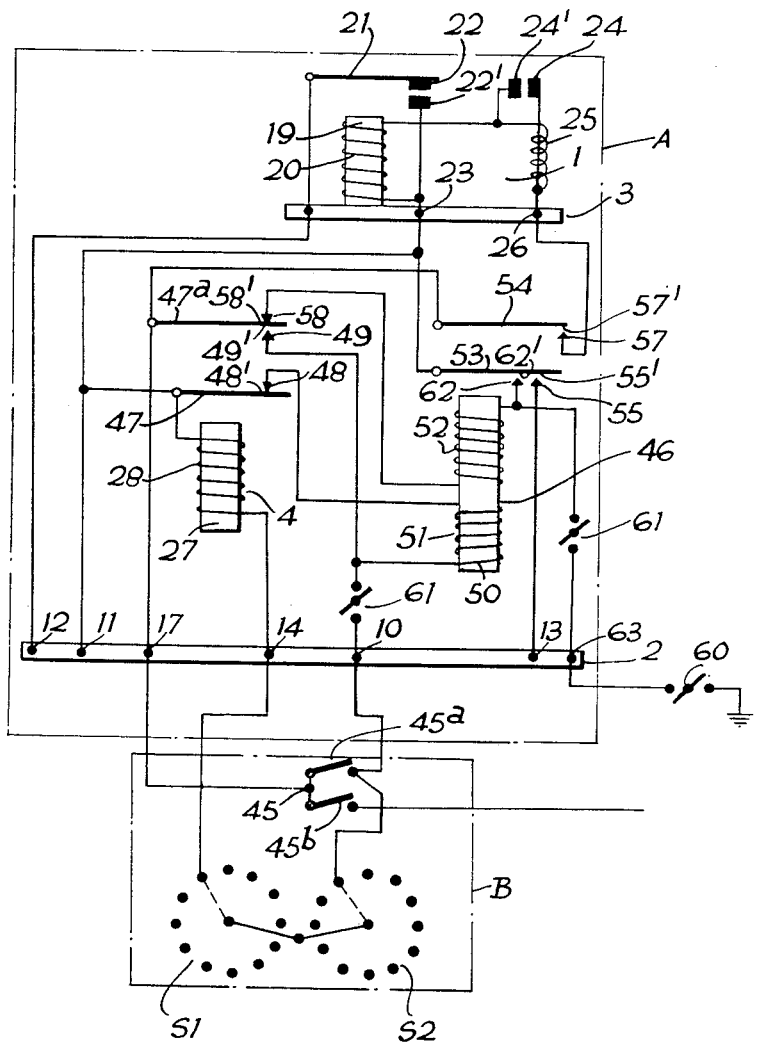

Oct. 9, 1962  A. T. V. JOHNSON  3,058,092
ELECTRICAL SYSTEMS FOR PREVENTING UNAUTHORISED
USE OF VEHICLES PROPELLED BY INTERNAL
COMBUSTION ENGINES
Filed Feb. 10, 1961                         4 Sheets-Sheet 4
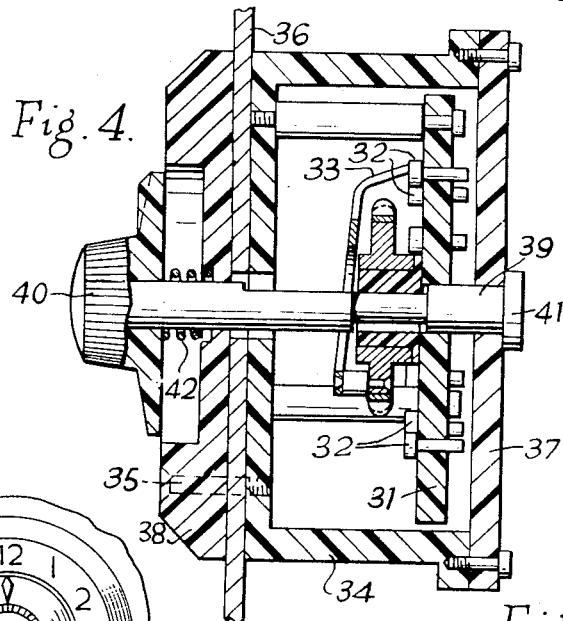
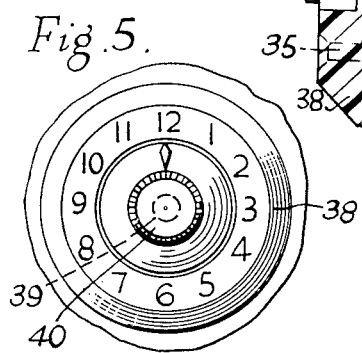
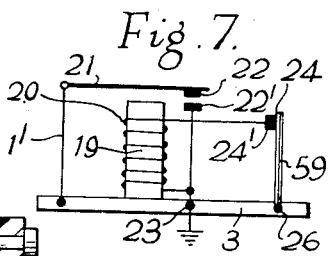
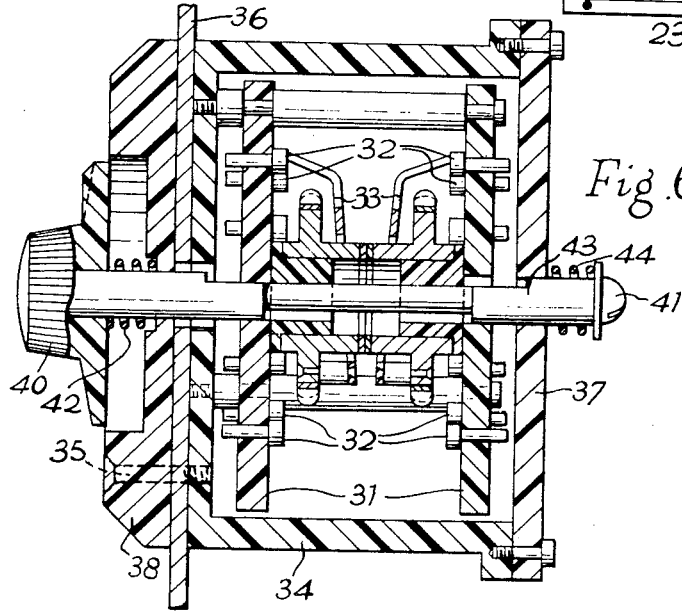

United States Patent Office 3,058,092
Patented Oct. 9, 1962

3,058,092
ELECTRICAL SYSTEMS FOR PREVENTING UNAUTHORISED USE OF VEHICLES PROPELLED BY INTERNAL COMBUSTION ENGINES
Arthur T. V. Johnson, Melton Mowbray, England, assignor of one-half to The Melton Garage and Engineering Company Limited, Melton Mowbray, England, a British company
Filed Feb. 10, 1961, Ser. No. 88,560
2 Claims. (Cl. 340—64)

The invention relates to electrical protective systems for preventing unauthorised use, including theft, of vehicles, more especially road vehicles, propelled by internal combustion engines.

The primary object of the invention is to provide an improved and effective system for this purpose designed to operate with a minimum of interference with the existing equipment of a vehicle.

Another object is to provide such an electrical protective system which is adapted to cause emission of a warning signal and also to immobilise the engine automatically upon unauthorised interference with the vehicle, the purpose of the said signal being to scare off the intruder and at the same time to attract the attention of the police and the public.

A still further object of the invention is to provide such an electrical system which is designed to operate, if desired, without the use of an existing ignition key, or of an additional key, so that there is neither a lock to be forced nor a key to be lost or copied.

Yet other aims are to provide a system of the class concerned which will eliminate the use of a "secret switch" and the known disadvantages of such, cause no delay to the owner and/or driver by tedious operation and make provision whereby the owner can readily change an effective combination as frequently as may be desired or occasion may demand.

Not only so, but the electrical protective system of this invention is capable of being fitted as standard equipment by a vehicle manufacturer, and is designed to be just as effective when fitted to every vehicle as when fitted to only a few.

The electrical protective system constituting this invention comprises at least two interconnected multi-position switches each having only one wafer, said switches providing between them a comparatively large number of combinations and being incorporated in an engine starting control circuit combined with an alarm circuit including an alarm device adapted, when actuated, to emit a warning signal, and the arrangement of the system being such that only by setting the multi-position switches to one predetermined correct combination can the internal combustion engine be started, any other, i.e. incorrect, combination of the multi-position switches failing to create the conditions necessary for starting the engine and resulting, in the event of an attempt by an unauthorised person to start the engine, in the emission of a warning signal.

Preferably, although there is no limitation in this respect, the protective system is applied to a vehicle propelled by an engine relying on spark ignition; in this case the engine starting control circuit controls the conditions which enable the engine ignition to be switched on, and all incorrect combinations of the multi-position switches result in the emission of a warning signal in the event of such ignition being switched on.

Advantageously the multi-position switches are microswitches capable of passing only relatively light current, and the engine starting control circuit includes relay means designed to exclude comparatively heavy current from the switch contacts when the multi-position switches are set to the predetermined correct combination.

A relay associated with the single wafer multi-position switches may advantageously be so constructed and arranged that when once these switches have been set to the predetermined correct combination and the ignition or equivalent has been switched on, the said switches can immediately thereafter be disarranged and yet the vehicle will continue to function normally until such time as the ignition or equivalent is next switched off to stop the engine. In this way there is provided a completely confidential combination, in that the ignition or equivalent cannot be switched on again without causing emission of a warning signal until the correct combination has been selected.

Accordingly, all that the driver of a vehicle equipped with the improved electrical protective system has to do is to select the correct predetermined combination and press an ignition switch. This simple action in any event takes no longer than using a conventional ignition key, and may well take much less time. A normal ignition key can, however, be used in the usual way, if so desired, but in any case the vehicle will only function normally if the correct combination has been set. Thus, switching on the ignition by a normal ignition key, when the multi-position switches are incorrectly set, would merely bring about the aforementioned conditions in which the engine is immobilised and the alarm device is set into operation. The system is also such that only the driver alone may ever know the correct combination, notwithstanding the frequent presence of other persons in the vehicle. This, of course is not possible with numbered keys or so-called secret switches. There is, therefore, no necessity for secrecy; indeed, the fact that the vehicle is equipped with the improved electrical protective system could advantageously be made known to all by any appropriate means of advertisement.

In order that the invention may be more clearly understood and readily carried into practical effect, specific wiring diagrams of the improved electrical protective system applied to a vehicle propelled by an engine relying on spark ignition and embodying the foregoing and other features, will now be described with reference to the accompanying purely diagrammatic drawings, wherein, FIGURE 1 represents the simplest form of the basic electric system designed to prevent unauthorised use or theft of a vehicle, FIGURES 2 and 3 depict modifications of this basic system, hereinafter to be described, FIGURE 4 is a cross-sectional view of a typical single-wafer multi-position switch suitable for incorporation into the electrical system shown in FIGURES 1-3.

FIGURE 5 is an elevational view, drawn to a smaller scale, of the said switch, as seen from the outer side of the vehicle panel in which it is mounted, FIGURE 6 is a further cross-sectional view, similar to FIGURE 4, showing two single-wafer multi-position switches having a single spindle and control knob common to both, and FIGURE 7 represents an alternative form of circuit breaker for inclusion in the alarm circuit.

Like parts are designated by similar reference characters throughout the drawings.

Referring to the basic electrical protective system illustrated in FIGURE 1 and applicable to a road vehicle propelled by an internal combustion engine, it will be seen that this includes a main unit A and an "internal combination" unit B. Forming a part of the system is also a shroud or cover (not shown) which consists of a light steel pressing adapted to be fitted over the top of the ignition coil of the engine. Into this shroud extends a flexible metal conduit from the main unit A, and the function of the said shroud is to prevent the cutting of the earthing wire attached to the circuit breaker terminal of the coil.

The main unit A consists of a casing in which is housed a circuit breaker 1 associated, in this particular example, with the existing vehicle horn (not shown) to provide an aural alarm device, two terminal blocks 2 and 3 and a control relay 4. This relay controls in all three pairs of contacts, viz. two pairs of contacts 5, 5' and 6, 6' allied to a spring loaded armature 7, and a single pair of contacts 8, 8' allied to a second spring loaded armature 9. On the terminal block 2 are mounted a terminal 10 to which is attached a wire from the ignition auxiliary, a terminal 11 to which is attached a wire from earth, a terminal 12 to which is attached a wire from the vehicle horn button or from the horn relay (if fitted), a terminal 13 to which is attached a wire from the circuit breaker terminal of the coil, and a terminal 14 from which extends a wire 15 to the internal combination unit B. Also extending into the unit B is a live feed wire 16 from a positive terminal 17 on the block 2, and a wire 18 from the ignition auxiliary terminal 10.

Very briefly, the internal combination unit B comprises two multi-position switches $S_1$ and $S_2$ housed in a container and also a knob or knobs for actuating the same as will be hereinafter fully described.

The circuit breaker 1 is designed to produce a regularly intermittent and compelling warning signal readily recognisable by the police and public. It also protects the horn against overheating and damage which would occur, together with undue battery drain, if the horn were permitted to emit a continuous signal. As will be seen, the circuit breaker 1 comprises an iron core 19 having a winding 20 which controls an associated spring-influenced armature 21. Attached to this armature is a contact 22 arranged to co-operate with a companion contact 22' which is connected to the earth terminal 23 mounted on block 3. The contacts 24, 24' of a second pair are controlled by a heating element 25. Both pairs of contacts 22, 22' and 24, 24' are normally open. However, when current is made available at a terminal 26 on the block 3 it will return to earth via the heating element 25 and the winding 20 the resistances of which are such that the majority of the applied voltage will be "dropped" across the said heating element. As a consequence, the armature 21 will be insufficiently attracted against its spring to close the contacts 22, 22'. The heating element 25 will thus become heated by the current flow, and the contacts 24, 24' will close. Such closure will, in turn, "short out" the heating element 25, thereby dropping the whole of the applied voltage across the winding 20, causing full attraction of the armature 21 and thus closing the contacts 22, 22' to cause the horn to sound. The heating element 25 will thereupon be "shorted out" by virtue of the contacts 24, 24' being closed with the result that this element will cool off, so causing the contacts 24, 24' to open again. The majority of the applied voltage will accordingly be again dropped across the heating element 25, causing the contacts 22, 22' to open again. It is in this way that the horn is caused to sound intermittently whenever current is supplied to the terminal 26.

The control relay 4 is operated by an iron core 27 having a winding 28 one end of which is attached to the terminal 14 and the other to earth. The spring loaded armature 7 controlled by the relay 4 is connected to the ignition auxiliary terminal 10, whilst the similarly controlled armature 9 is connected to earth. The pair of contacts 8, 8' influenced by the armature 9 are normally closed and in this condition serve to short to earth the terminal 13. The two pairs of contacts 5, 5' and 6, 6' both influenced by the armature 7 are normally closed and open respectively. If the ignition is switched on, either by closure of a switch 29 embodied in the unit B, or by means of a normal ignition key, without first setting the multi-position switches $S_1$ and $S_2$ to the correct predeterminted positions, then the circuit breaker terminal 13 will remain earthed via the contacts 8, 8', and ignition auxiliary current will be available at the terminal 26 via the contacts 5, 5' thereby bringing about the intermittent operation of the horn as hereinbefore explained.

If, however, the correct predetermined combination is selected on the multi-position switches $S_1$ and $S_2$ before switching on the ignition, current will also be available, through the said switches, at the terminal 14. This current will then flow round the winding 28 to earth, thereby energising the control relay 4, opening the contacts 5, 5' and 8, 8' and closing the contacts 6, 6'. The said closed contacts 6, 6' supply ignition auxiliary current to the winding 28 so that even if the multi-position switches $S_1$ and $S_2$ are now disarranged at will, the relay 4 will still remain energised so that the vehicle will continue to function normally until such time as the engine is stopped by opening the switch 29 or appropriately turning the ignition key, as the case may be. Thereafter, the engine cannot be re-started (assuming that the multi-position switches $S_1$ and $S_2$ have been disarranged as mentioned above) until such switches have again been correctly reset to the predetermined combination. The switch indicated at 30 in FIGURE 1 is provided for use in a case where the vehicle starter switch is combined with the ignition key. It will be appreciated from the foregoing description that the switch 29, which is a simple On/Off switch, will directly switch on the ignition, and that the alarm will only continue whilst the said switch is on—or the ignition is switched on by a normal key.

As to the two multi-position switches $S_1$ and $S_2$ in the illustrated example, each of these may conveniently include a circular wafer of non-conductive material such as that indicated at 31 in FIGURE 4 or FIGURE 6, carrying in addition to a fixed circular series of equi-spaced contacts 32 (say twelve in number) a common terminal, and a rotary common ring permanently in contact with the common terminal and provided with a protuberant contact 33 which is turnable from one fixed contact 32 to another. In one arrangement there may be two quite separate multi-position switches of this form each mounted in the manner shown in FIGURES 4 and 5. As will be seen, such switch is accommodated in a small cylindrical casing 34 which is secured by screws 35 to the inner side of a metal panel 36 of the vehicle. The back of the casing 34 is closed by a cover plate 37 which is readily removable for access to the wafer 31 so that the combination can be changed. Secured to the outer side of the panel 36, by the aforesaid screws 35, is a fixed dial 38 disposed coaxially with respect to the casing 34 and marked with numbers indicative of the positions of the fixed contacts 32. To turn the common ring and hence also the movable contact protruding therefrom there is provided a longitudinally displaceable operating spindle 39 which is furnished with a knob 40 and retained by 41. A spring 42 is provided to control the spindle 39, this spring serving normally to hold the spindle in an inoperative position in which it can be freely turned without moving the protuberant contact 33. Whenever, however, it is desired to engage the contact 33 with a selected fixed contact 32, the knob 40 is first pushed in (or it may be pulled out) to displace the spindle 39 longitudinally and cause it to drivingly engage the common ring, whereupon turning of the knob will rotate the common ring and thus enable the contact 33 to be turned to the desired position. Upon subsequent release of the knob, the spindle 39 will slidably return to its inoperative position in which it is disengaged from the common ring—this then enabling the knob to be freely rotated whilst leaving the switch set at the correct position, thus not disclosing the correct combination.

But instead of the two multi-position switches $S_1$ and $S_2$ being separated as just described, they may alternatively be so combined that their individual operating spindles and knobs are co-axially arranged, the arrangement again being such that the knobs are normally free to rotate without turning the movable contacts.

In a still further alternative, an example of which is depicted in FIGURE 6, the two multi-position switches $S_1$ and $S_2$ are both adapted to be controlled by a common spindle 43 controlled by springs 42 and 44 and the knob 40 of which can be pushed in one direction to turn the common ring and the rotary contact of one multi-position switch and pulled in the opposite direction to similarly turn the common ring and the rotary contact of the other multi-position switch, the arrangement being such, moreover, that in a central, i.e. neutral, position to which the spindle is automatically returned whenever it is released, the knob can be freely turned without affecting either switch.

In any event, the two wires 15 and 18 from the main unit A finally terminate at the multi-position switches $S_1$ and $S_2$ in the form of a cable end which provides for quick and simple removal from one switch contact and transfer to another in order to facilitate a change in the correct combination. The common terminals on the wafers of the two multi-position switches $S_1$ and $S_2$ are interconnected.

In the circuit hereinbefore described with reference to FIGURE 1, the alarm continues to be emitted only whilst the switch 29 is On or the ignition is switched on by a normal key, as the case may be. If, however, the alarm device is required to continue in operation, once unauthorised interference of the vehicle has occurred and whether or not the ignition remains switched on via the switch 29 or a conventional key, a modification of the basic electrical system illustrated in FIGURE 1 is necessary. Such a modification is shown in FIGURE 2. In this alternative, there is provided in lieu of the simple On/Off switch 29 a momentary contact double pole single throw switch 45. One pole, 45a, of this switch performs the function of the original switch 29 in a modified form, whilst the other pole 45b operates the starter whilst it is held, thereby performing the function of the switch 30 in the circuit shown in FIGURE 1. The circuit breaker 1 in the modified circuit operates in the same manner as that already described in regard to the basic circuit. The modification includes the incorporation into the main unit A of two relays, viz. a first control relay 4 consisting of an iron core 27 and a winding 28, as before, and a second relay 46. The first relay 4 controls two armatures 47 and 47a. The core 27 is, as in the previous example, energised by the winding 28 for the vehicle to function normally. The first armature 47 controlled by the relay 4 is connected to the earth terminal 11 as is the armature in the first described example, whilst the second armature 47a controlled by the same relay is connected to the positive terminal 17 instead of being connected to the ignition auxiliary terminal 10 as is the armature 7 in the said first described example. Associated with the armatures 47 and 47a are two pairs of contacts 48, 48' and 49, 49' respectively. The second relay 46 which comprises a core 50 energised by the two windings 51 and 52, serves to control two armatures 53 and 54. The armature 53 is connected to earth, via the terminal 23 on the block 3, and is normally open, its associated contacts 55, 55' shorting to earth a wire 56 attached to the circuit breaker terminal 13 when the relay 46 is energised. The armature 54, which is connected to the positive terminal 17, has associated therewith two pairs of normally open contacts 57, 57' and 58, 58'. When, upon energisation of the relay 46, the contacts 57, 57' close, current is supplied to the terminal 26 on the block 3. The contacts 58, 58', when closed upon energisation of the said relay during unauthorised interference with the vehicle, provide current for the "holding" winding 52. In the modification now being described, the switch 45 does not directly switch on the ignition, but if this switch is depressed whilst the two multi-position switches $S_1$ and $S_2$ are correctly set, then current will be supplied to terminal 14 as a result of which the contacts 48, 48' and 49, 49' will be closed—closure of the last mentioned contacts switching on the ignition. When the switch 45 is released, current will still continue to flow through the multi-position switches $S_1$ and $S_2$ to the terminal 14 and thereby maintain energisation of the main relay 4 for so long as the multi-position switches are set at the correct predetermined combination. Thus, the only way to switch off the ignition is to disarrange the switches $S_1$ and $S_2$ which action will automatically set the system in a "safe" condition, i.e. so that it cannot be inadvertently forgotten and left in the "correct combination" position as would be possible merely by switching off the normal On/Off switch 29 in the FIGURE 1 arrangement. In order to conceal the correct combination in this case it would be necessary to provide disengageable freely rotatable knobs for operating the multi-position switches hereinbefore described.

As the contacts 49, 49' close, the contacts 48, 48' open. The purpose of the contacts 48, 48' in the FIGURE 2 arrangement is to prevent energisation of the second relay 46 which would otherwise occur because current is supplied to the winding 51 via the ignition auxiliary terminal 10 when the switch 45 is depressed and would still be available even when switch 45 is released because the contacts 49, 49' are closed.

Now if the switch 45 is depressed by an unauthorised person, without the multi-position switches having been first set at the correct predetermined combination, then the contacts 49, 49' will not be closed and the contacts 48, 48' will remain closed; consequently, the ignition will not be switched on and all the previously open contacts 55, 55', 57, 57' and 58, 58' on the second relay 46 will close. This closure of contacts 55, 55' will short to earth the wire 56 attached to the circuit breaker terminal 13, the closure of the contacts 57, 57' will supply current to the terminal 26 with the result already described herein, and the closure of the contacts 58, 58' will supply current to the "holding" winding 52, thereby maintaining these conditions even after the switch 45 is released. Once this unauthorised interference of the vehicle has occurred, the condition resulting in defective ignition and sounding of the alarm can only be corrected by setting the multi-position switches to their correct positions and depressing the switch 45. This will stop the alarm and switch on the ignition. The ignition can thereupon be switched off by disarranging the multi-position switches $S_1$ and $S_2$, thus leaving the system once more in the "safe" condition.

The circuit breaker 1 illustrated in FIGURES 1 and 2 operates with a slight delay. If, however, it is desired that the circuit breaker shall be "instant operating" then it may be modified in the manner depicted in FIGURE 7, i.e. by the provision therein of a bi-metal strip 59 in the place of the heating element 25.

When, in this modified circuit breaker, current is made available at the terminal 26, it will flow through the bi-metal strip 59 and the pair of contacts 24, 24' to the relay winding 20 thereby attracting the relay armature 21 and closing the contacts 22, 22' to sound the horn. The current flowing in the relay winding 20 is sufficient to cause the bi-metal strip 59 to distort and open the contacts 24, 24'; this, in turn, will interrupt the flow of current to the relay winding 20, so that the armature 21 will be released and move under spring action to cause the relay contacts 22, 22' to open and so bring about a cessation of the warning signal emitted by the horn. The bi-metal strip will thereupon cool off and the contacts 24, 24' will again close, this cycle being repeated again and again whilst current is supplied to the terminal 26. In this way a regularly intermittent signal will be emitted by the horn.

An aural alarm may alternatively take the form of a bell, horn or the like in order that the system may be quite independent of the vehicle horn or horns. Or such an aural signal may, if desired, be replaced by a visual signal on the outside of the vehicle. Or the visual signal may be additional to the aural signal. In either case the said signal may be either continuous or intermittent.

Now some users of the "protective" system may wish provision to be made whereby the said system can be easily and quickly "neutralised" or "switched off" as occasion may demand. But such provision, although enabling the system to be neutralised by an authorised person, must not allow the system to be put out of operation by an unauthorised person, once the defective ignition condition has been brought about and the alarm has been sounded by unauthorised interference of the vehicle. It will be seen that in FIGURE 3 this provision is in the form of a single throw, double pole switch 61 which is incorporated in the main unit A intended to be located under the engine bonnet of the vehicle. In FIGURE 3 the two poles of the switch 61 are shown separated. Thus, to reach the neutralising switch 61, the bonnet has to be opened. To protect the switch 61 and so prevent it from being actuated by an unauthorised person to neutralise the electrical protective system, the latter in this case includes a switch 60 adapted to be operated by the engine bonnet and itself to initiate the emission of a warning signal in the event of the said bonnet being opened. The switch 60 is a simple On/Off switch with a bias to On but is normally held in the Off position by the closed bonnet. One side of the switch 60 is connected to a bonnet switch terminal 63 on the block 2 whilst the other side is earthed. In the system illustrated in FIGURE 3, the contacts on the two relays 4 and 46 are modified somewhat as compared with the contacts in the system shown in FIGURE 2. The holding winding 52 is still connected at one end to the contacts 58, 58', but the latter are in this case associated with the armature 47a of the first relay 4 and not with the armature 54 of the second relay 46. The contacts 58, 58', however, are normally closed whenever the relay 4 is not energised instead of being normally open whenever the relay 46 is not energised. The other end of the holding winding 52 instead of going to earth via the contacts 48, 48' and the armature 47, as in FIGURE 2, now goes to earth via the neutralising switch 61 and the bonnet switch 60 when the bonnet is opened and the neutralising switch 61 is closed. Thus whenever the bonnet is opened whilst the neutralising switch is closed, the core 50 will be energised, thereby closing the contacts 57, 57' to sound the alarm and also closing the contacts 55, 55' to create defective ignition. This can be prevented by setting the correct predetermined combination on the multi-position switches S₁ and S₂ and pressing the switch 45 which will switch on the ignition and open the contacts 58, 58'.

An additional set of contacts 62, 62' associated with the earth armature 53 is also connected to the end of the winding 52 which leads to the neutralising switch 61. The purpose of these contacts is to complete the winding 52 to earth irrespective of the condition of the neutralising switch 61 and the bonnet switch 60 once the core 50 has been energised by opening the bonnet. Thus, if an unauthorised person atempts to neutralise the system when the vehicle has been left at "safe," the opening of the bonnet to gain access to the neutralising switch 61 will energise the core 50, closing all three sets of contacts 55, 55', 57, 57' and 62, 62' with the results already described.

It will be appreciated that in FIGURES 2 and 3, the armatures 53 and 54 substantially correspond respectively to the armatures 9 and 7 in FIGURE 1; similarly the set of contacts 55, 55' and 57, 57' in FIGURES 2 and 3 correspond more or less to the contacts 8, 8' and 5, 5' in FIGURE 1. But because the correspondence is not exact, different numerals have been used to designate the different parts.

In the case of a vehicle fitted with a diesel, i.e. compressed ignition engine, contacts 8, 8' (FIGURE 1) or 55, 55' (FIGURES 2 and 3) may be adapted to open circuit the starter motor relay, thereby rendering the starter motor inoperative. Alternatively, the said contacts could be employed in the manner generally shown in FIGURES 1, 2 and 3 but to operate a solenoid-actuated butterfly shut-off valve in the engine air intake, this valve prohibiting the entry of air to the engine whenever the solenoid is energised.

I claim:
1. In a vehicle propelled by an internal combustion engine equipped with spark ignition means having a circuit breaker coil terminal and an ignition auxiliary terminal, an electrical protective system for preventing unauthorised use of said vehicle, said system comprising, in combination, a first terminal block; a second terminal block, a first relay including an iron core, a winding thereon, a first spring loaded armature and a second spring loaded armature both attractable by said core when current is passed through said winding; a first pair of contacts allied to said first armature, these contacts being opened upon the first armature being attracted to the core; a second pair of contacts allied to said second armature and arranged to close upon the latter being attracted to the core; a third pair of contacts allied to the second armature and arranged to close upon said armature being so attracted; a second relay including a core, a first and a second winding for energising said core, a third armature and a fourth armature attractable by the last mentioned core; a fourth pair of contacts allied to said third armature, these contacts being closed when the third armature is attracted to the core of the second relay; a fifth pair of contacts allied to said fourth armature, such contacts closing when the fourth armature is attracted as aforesaid; interconnected first and second multi-position switches of the micro type each being capable of passing only relatively light electric current and said switches each having only one wafer but a plurality of switch contacts whereby the switches are adapted to provide between them a large number of possible combinations; a momentary contact double pole single throw switch having one pole which performs the function of switching the ignition on and off and another pole for operating the engine starter whilst it is held; a circuit breaker adapted to actuate an alarm device intermittently, said circuit breaker including an iron core, a circuit breaker winding around said core, a fifth armature controlled by said core, a sixth pair of contacts allied to the fifth armature and arranged to close when the fifth armature is attracted to the circuit breaker core and a heating element serving to control the opening and closing of a seventh pair of contacts; a first terminal on said first terminal block to which is attachable a wire from the ignition auxiliary terminal of the spark ignition means; a wire extending between said first terminal and one of the second pair of contacts; a further wire connecting said first terminal with one side of that pole of the double pole single throw switch which functions for switching on and off the ignition; a connection between said pole and a switch contact of the second multi-position switch; a second terminal on said first terminal block which is attachable to earth; a first terminal on said second terminal block which is connected both to one end of the circuit breaker winding as well as to one of the sixth pair of contacts; a wire extending from the second terminal on the first terminal block to the said first terminal on the second terminal block; a connection between the last mentioned wire and one end of the winding of the first relay and the first armature; a connection between the appropriate one of the first contacts and one end of the first winding on the core of the second relay; a connection between the opposite end of said first winding and the aforementioned wire extending between said first terminal on the first terminal block and one of the second pair of contacts; a connection between the third armature and said first terminal on the second terminal block; a second terminal on the second terminal block to which is attached the heating element in the circuit breaker; a connection between the last mentioned terminal and one of the fifth pair of contacts; a connection between the relevant end of the circuit breaker winding and said heating element to which connection is also connected one of the seventh pair of contacts; a third terminal on the first terminal block to which is attachable a wire from the aforementioned alarm device; a third terminal on the second terminal block; a connection between the last mentioned terminal and the fifth armature; a wire connecting the third terminal on the first terminal block with the third terminal on the second terminal block; a fourth terminal on the first terminal block to which is attachable a wire from the circuit breaker terminal of the coil; a connection between said fourth terminal and one of the fourth pair of contacts; a fifth terminal on the first terminal block which is connected to the appropriate end of the winding of the first relay and also to a switch contact of the first multi-position switch; a sixth terminal on said first terminal block which is connectable to the positive side of a source of current; a wire extending between this sixth terminal and the double pole single throw switch and a wire connecting the second and the fourth armatures; a seventh terminal on the first terminal block; a connection extending between said seventh terminal and one end of the second winding on the core of the second relay; a connecting wire extending between the opposite end of said second winding and the relevant one of the third pair of contacts; an eighth pair of contacts associated with the third armature and one of which is connected with the connection extending between the seventh terminal and the relevant end of the second winding of the second relay; a switch arranged to be operated by an engine bonnet of the vehicle, one side of said switch being connected to earth while the other side is connected to the seventh terminal on the first terminal block, and a double pole neutralising switch the poles of which are separated—one such pole being incorporated in the wire extending between said first terminal and one of the second pair of contacts whilst the other pole is incorporated in the connection between the seventh terminal and the relevant end of the second winding on the core of the second relay.

2. In a vehicle propelled by an internal combustion engine equipped with a battery, spark ignition means having a circuit breaker coil terminal and an ignition auxiliary terminal, an electrical protective system for preventing unauthorised use of said vehicle, said system comprising, in combination, an alarm circuit incorporating an electrically-operable alarm device; a first relay having a winding; first and second pairs of normally closed contacts allied to said first relay and openable upon energisation of said first relay; a third pair of contacts which are allied to said first relay and normally open and arranged to close upon said first relay being energised, said first relay being energised when the engine is to function normally; a second relay having a first and a second winding for energising said relay; first, second, and third pairs of normally-open contacts allied to said second relay, all of these pairs of contacts allied to said second relay being closed upon energisation of said second relay; a switch unit comprising at least two multi-position switches having a plurality of switch contacts whereby the switches are adapted to provide between them a large number of possible combinations; a momentary-contact double-pole-single-throw ignition switch having a first pole which performs the operation of energising said first relay to switch the ignition "on" and a second pole for operating the engine starter whilst the said ignition switch is held; and a double pole "on/off" neutralising switch, the poles of which are separate from one another; said winding of said first relay being connected in series with said multi-position switches and the first pole of said ignition switch to positive and negative poles of said battery whereby said relay is energised when the multi-position switches are set to the correct predetermined combination and said ignition switch is momentarily switched "on," and the first winding of said second relay being connected in series with one pole of said neutralising switch, the first pole of said ignition switch and the first pair of normally-closed contacts allied to said first relay, to the positive and negative poles of said battery whereby said second relay is energised when the neutralising switch is "on" and the said ignition switch is momentarily depressed the multi-position switches are set to an incorrect combination so that the first relay is not energised; the aforesaid ignition auxiliary is connected in series with the first pole of said neutralising switch and said normally-open contacts allied to the first relay to a positive pole of said battery whereby the ignition will be switched "on" whenever the first relay is energised by momentary depression of said ignition switch to "on," the first relay remaining energised so that ignition current continues to be supplied as a result of closure of said normally-open contacts allied to the first relay, the ignition being switched "off" only by setting the multi-position switches to an incorrect combination; said second winding of the second relay being connected in series with the aforesaid second pair of normally-closed contacts allied to said first relay and the second pole of said neutralising switch to the positive and negative poles of said battery whereby when said second relay has been energised by said first winding, said first relay not being energised, said second winding will hold the second relay energised even when the said ignition switch is released, said second winding of said second relay also being connected at one end via the said second pair of normally-open contacts allied to said second relay by-passing the said pole of said neutralising switch to the relevant pole of said battery whereby said second relay, once energised, remains energised irrespective of operation of the neutralising switch; said alarm circuit being connected, via the third pair of normally-open contacts allied to said second relay, with the positive and negative poles of said battery whereby said alarm device is rendered operative when the second relay is energised; and said circuit breaker coil terminal being connected via said first pair of normally-open contacts allied to the second relay to the negative pole of the battery whereby whenever the second relay is energised the circuit breaker terminal is connected to the battery negative to immobilise the engine.

References Cited in the file of this patent

UNITED STATES PATENTS 2,517,619    Ainley _____ Aug. 8, 1950